(12) United States Patent
Chon et al.

(10) Patent No.: US 11,351,875 B2
(45) Date of Patent: *Jun. 7, 2022

(54) MULTI-INPUT CHARGING SYSTEM AND METHOD USING MOTOR DRIVING SYSTEM

(71) Applicants: HYUNDAI MOTOR COMPANY, Seoul (KR); KIA MOTORS CORPORATION, Seoul (KR)

(72) Inventors: Chae Duck Chon, Hwaseong-si (KR); Jung Hwi Kim, Hwaseong-si (KR); Tae Hee Jung, Hwaseong-si (KR); Soung Han Noh, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 342 days.

This patent is subject to a terminal disclaimer.

(21) Appl. No.: 16/671,037

(22) Filed: Oct. 31, 2019

(65) Prior Publication Data

US 2020/0361323 A1 Nov. 19, 2020

(30) Foreign Application Priority Data

May 17, 2019 (KR) .................. 10-2019-0057990

(51) Int. Cl.
*H02J 7/00* (2006.01)
*H02J 7/14* (2006.01)
*B60L 50/61* (2019.01)
*H02P 27/06* (2006.01)
*B60L 53/22* (2019.01)
*H02M 7/44* (2006.01)
*B60L 50/60* (2019.01)
*H02J 7/16* (2006.01)

(52) U.S. Cl.
CPC ............... *B60L 50/61* (2019.02); *B60L 50/66* (2019.02); *B60L 53/22* (2019.02); *H02J 7/16* (2013.01); *H02M 7/44* (2013.01); *H02P 27/06* (2013.01)

(58) Field of Classification Search
USPC ........................................ 320/103, 104, 109
See application file for complete search history.

(56) References Cited

U.S. PATENT DOCUMENTS

| | | | |
|---|---|---|---|
| 2020/0184746 A1* | 6/2020 | Shin | B60L 3/0023 |
| 2020/0247255 A1* | 8/2020 | Yumoto | B60L 53/16 |
| 2020/0313581 A1* | 10/2020 | Chon | H02M 7/53871 |
| 2021/0336472 A1* | 10/2021 | Bae | H02M 3/1584 |

FOREIGN PATENT DOCUMENTS

| | | |
|---|---|---|
| KR | 10-2019-0119778 A | 10/2019 |
| KR | 10-2020-0068175 A | 6/2020 |
| KR | 10-2020-0075937 A | 6/2020 |

* cited by examiner

*Primary Examiner* — Alexis B Pacheco
(74) *Attorney, Agent, or Firm* — Morgan, Lewis & Bockius LLP

(57) ABSTRACT

A multi-input charging system and a multi-input charging method using a motor driving system can promptly compulsorily discharge a high charging voltage formed in a neutral point capacitor forming a neutral point voltage in a charging process and formed in a DC capacitor between an inverter and a battery.

18 Claims, 4 Drawing Sheets

MULTI-INPUT CHARGING SYSTEM AND METHOD USING MOTOR DRIVING SYSTEM

CROSS REFERENCE TO RELATED APPLICATION

The present application claims the benefit of priority to Korean Patent Application No. 10-2019-0057990, filed on May 17, 2019 in the Korean Intellectual Property Office, the entire contents of which is incorporated herein by reference.

TECHNICAL FIELD

The present disclosure relates to a multi-input charging system and a multi-input charging method using a motor driving system, and more particularly, to a multi-input charging system and a multi-input charging method using a motor driving system by which a capacitor used to form a specific voltage in a battery charging process can be promptly discharged after the charging is completed.

BACKGROUND

In general, electric vehicles or plug-in hybrid vehicles charge a battery by converting electric power provided from external electric vehicle supply equipment into a state that is suitable for charging a battery in a vehicle and providing the converted electric power to the battery.

For example, the electric vehicle supply equipment for rapid charging according to the related art is manufactured to output a single rated voltage of 400 V, but a battery used in a vehicle tends to be designed to have a voltage of 800 V or more in order to improve efficiency and traveling distance. Accordingly, the rapid charging electric vehicle supply equipment still provides a charging voltage of 400 V, but because the battery used in the vehicle has a voltage specification of 800 V or higher, a booster converter for boosting the voltage provided from external electric vehicle supply equipment is required to charge the battery.

However, the high-capacity converter for boosting the voltage of a wide range cannot be equipped in a vehicle due to the heavy weight, the large volume, and the high price thereof and may cause an increase of the price of the vehicle.

Accordingly, in the technical field, a battery charging technique using a motor neutral point capable of receiving the voltage of electric vehicle supply equipment, which is established as an existing infrastructure and provides a relatively low charging voltage, boosting a voltage without an additional device and an additional increase in costs, providing the boosted voltage to a battery, and charging the battery.

The battery charging technique using a motor neutral point is a charging scheme of applying external charging power to the motor neutral point, boosting the voltage of the motor neutral point to a voltage level that may charge the voltage by using a coil of the motor and the switching elements of an inverter. If the external charging voltage has a magnitude that is suitable for a battery charging voltage, an external charging voltage may be directly applied to the battery instead of applying external power to the motor neutral point. In this way, the charging system that boosts an external charging voltage by using a motor and an inverter when the external charging voltage is lower than a charging voltage or provides the charging power directly to the battery when the external charging voltage is suitable for the battery charging voltage may be named a multi-input charging system in an aspect that the battery may be charged by applying various external charging voltages.

In the multi-input charging system, various capacitors, such as a capacitor for forming the voltage of the neutral point of a motor when external charging voltage is applied or a capacitor for forming the voltage provided to the battery may be applied. In the battery charging process, the capacitors may be charged by a very high voltage. For example, a high voltage of at least 400 to 800 V is formed in a capacitor that forms a neutral point voltage and a capacitor that forms an inverter output voltage, and if the charges stored in the capacitors by the high voltage is not promptly compulsorily discharged while the battery is charged, there is a danger of electrically shocking the driver or the operation.

Accordingly, in order to stably implement the multi-input charging technique of the battery using a motor neutral point, a measure of compulsorily discharging the capacitors promptly after the charging is completed is inevitably required.

The items described as the background technologies are provided only for improvement of understanding of the background of the present disclosure, and should not be understood that it is admitted that the items correspond to the conventional technology that are known to those skilled in the art to which the present disclosure pertains.

SUMMARY

The present disclosure provides a multi-input charging system and method using a motor driving system that promptly compulsorily discharge a capacitor that forms the neutral point voltage of the motor and a capacitor that forms the output voltage of the inverter, in a process of providing DC power to a neutral point of the motor and generating a desired charging voltage through control of an inverter of a motor and switching elements in the inverter.

In accordance with an aspect of the present disclosure, a multi-input charging system using a motor driving system may include: a battery which is chargeable; an inverter connected to the battery and including a plurality of switching elements; a motor connected to the inverter and configured to supply power, which is provided to a neutral point of the motor, to the inverter; a first relay having one end connected to the battery and an opposite end connected to a charging power input terminal to which DC charging power is input from outside; a second relay having one end connected to the neutral point and an opposite end connected to the charging power input terminal; a neutral point capacitor connected to the opposite end of the first relay and the opposite end of the second relay and configured to form an input charging voltage; a third relay having one end connected to the neutral point capacitor and an opposite end connected to the charging power input terminal; and a controller configured to: in a charging mode for charging the battery, switch on the third relay and selectively switch on the first relay and the second relay based on a magnitude of the DC charging voltage to supply the DC charging power to the battery, and when charging of the battery is completed, control the plurality of switching elements of the inverter to compulsorily discharge the neutral point capacitor.

In an exemplary embodiment of the present disclosure, the controller may be further configured to: when the magnitude of the DC charging voltage is a magnitude allowing the battery to be charged in the charging mode, switch on the first relay and switch off the second relay to directly provide the DC charging power to the battery.

In an exemplary embodiment of the present disclosure, the controller may be further configured to: when the charging of the battery is completed, maintain an on-state of the first relay after cutting off the DC charging power; and perform a zero torque control of controlling the plurality of switching elements such that a d-axis component of a current provided from the inverter to the motor is a preset value other than 0 and a q-axis component of the current is 0.

In an exemplary embodiment of the present disclosure, the multi-input charging system may further include a main relay having one end connected to the battery and an opposite end connected to the one end of the first relay; and a DC capacitor connected to the opposite end of the main relay to form a DC voltage of an output terminal of the battery, and the controller may be further configured to: when the charging of the battery is completed, switch off the main relay after cutting off the DC charging power.

In an exemplary embodiment of the present disclosure, the controller may be further configured to: when the magnitude of the DC charging voltage is smaller than a magnitude of a voltage of the battery in the charging mode, switch on the second relay and switch off the first relay to supply DC charging power to the neutral point of the motor; and boost a voltage of the neutral point by controlling the switching elements of the inverter and apply the boosted voltage of the neutral point to provide charging power to the battery.

In an exemplary embodiment of the present disclosure, the controller may be further configured to: when the charging of the battery is completed, maintain an on-state of the second relay after cutting off the DC charging power; and perform at least one of: a zero torque control of controlling the plurality of switching elements such that a d-axis component of the current provided from the inverter to the motor is a preset value other than 0 and a q-axis component thereof is 0, a technique of switching on at least one of, among the plurality of switching elements of the inverter, a plurality of lower switching elements connected between the motor and a negative terminal of the battery, or a technique of switching on at least one of, among the plurality of switching elements of the inverter, a plurality of upper switching elements connected between opposite terminals of the battery.

In an exemplary embodiment of the present disclosure, the controller may be configured to perform any one of: the zero torque control, after performing the zero torque control, the technique of switching on the at least one of the plurality of lower switching elements, or the technique of switching on the at least one of the plurality of upper switching elements.

In an exemplary embodiment of the present disclosure, the multi-input charging system further include: a main relay having one end connected to the battery and an opposite end connected to the one end of the first relay; and a DC capacitor connected to the opposite end of the main relay to form a DC voltage of an output terminal of the battery, and the controller may be further configured to, when the charging of the battery is completed, switch off the main relay after cutting off the DC charging power.

In accordance with another aspect of the present disclosure, a charging method using the multi-input charging system may include: determining whether the charging of the battery is completed; when it is determined that the charging of the battery is completed, cutting off supply of the DC charging power; and determining an inverter control scheme for discharging the neutral point capacitor based on the DC charging power, and discharging the neutral point capacitor by controlling the plurality of switching elements in the inverter through the determined inverter control scheme.

In an exemplary embodiment of the present disclosure, the cutting off may include: identifying a voltage of the charging power input terminal; and when the voltage of the charging power input terminal is not zero, switching off the third relay.

In an exemplary embodiment of the present disclosure, the cutting off may include: identifying a voltage of the charging power input terminal; and when the voltage of the charging power input terminal is not zero, maintaining a state of the third relay.

In an exemplary embodiment of the present disclosure, the discharging the neutral point capacitor may include: when the battery is charged by switching on the first relay and switching off the second relay to directly provide the DC charging power to the battery, cutting off the DC charging power, maintaining an on-state of the first relay; and perform a zero torque control of controlling the plurality of switching elements such that a d-axis component of a current provided from the inverter to the motor is a preset value other than 0 and a q-axis component thereof is 0.

In an exemplary embodiment of the present disclosure, the multi-input charging system may further include: a main relay having one end connected to the battery and an opposite end connected to the one end of the first relay; and a DC capacitor connected to the opposite end of the main relay to form a DC voltage of an output terminal of the battery, and the maintaining the on-state of the first relay includes: after cutting off the DC charging power, maintaining the on-state of the first relay and switching off the main relay.

In an exemplary embodiment of the present disclosure, the discharging the neutral point capacitor may include: switching on the second relay and switching off the first relay to supply DC charging power to the neutral point of the motor; when the battery is charged by boosting a voltage of the neutral point by controlling the plurality of switching elements of the inverter and applying the boosted voltage to the battery to charge the battery, after cutting off the DC charging power, maintaining an on-state of the second relay; and performing at least one of: a zero torque control of controlling the plurality of switching elements such that a d-axis component of the current provided from the inverter to the motor is a preset value other than 0 and a q-axis component thereof is 0, a technique of switching on at least one of, among the plurality of switching elements of the inverter, a plurality of lower switching elements connected between the motor and a negative terminal of the battery, or a technique of switching on at least one of, among the plurality of switching elements of the inverter, a plurality of upper switching elements connected between opposite terminals of the battery.

In an exemplary embodiment of the present disclosure, the performing may include performing any one of: the zero torque control; after performing the zero torque control, the technique of switching on the at least one of the plurality of lower switching elements; or the technique of switching on the at least one of the plurality of upper switching elements.

In an exemplary embodiment of the present disclosure, the performing a technique of switching on at least one of, among the plurality of switching elements of the inverter, a plurality of lower switching elements connected between the motor and a negative terminal of the battery may include, when one lower switching element of the plurality of lower switching elements is switched off and then the one lower switching element in an on-state emits heat, switching off the one lower switching element that emits heat and switching on another lower switching element.

In an exemplary embodiment of the present disclosure, the performing a technique of switching on at least one of, among the plurality of switching elements of the inverter, a plurality of upper switching elements connected between the opposite terminals of the battery may include, if one upper switching element of the plurality of upper switching elements is switched off and then the one upper switching element in an on-state emits heat, switching off the one upper switching elements that emits heat and switching on another upper switching element.

In an exemplary embodiment of the present disclosure, the multi-input charging system further may include: a main relay having one end connected to the battery and an opposite end connected to the one end of the first relay; and a DC capacitor connected to the opposite end of the main relay to form a DC voltage of an output terminal of the battery, and the maintaining an on-state of the second relay may include: after cutting off the DC charging power, maintaining the on-state of the second relay and switching off the main relay.

According to the multi-input charging system and the multi-input charging method using a motor driving, a danger of electrically shocking the driver or the operator may be eliminated by promptly compulsorily discharging the charging voltage of high voltage formed in the DC capacitor between the neutral point capacitor, which forms a neutral point voltage in the charging process, and the inverter and the battery, and various safety references required by the rules can be satisfied.

The advantageous effects of the present disclosure are not limited to the above-mentioned ones, and the other advantageous effects will be clearly understood by an ordinary person skilled in the art to which the present disclosure pertains.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Hereinafter, a multi-input charging system using a motor driving system according to various exemplary embodiments will be described in detail with reference to the accompanying drawings.

Figure 1:
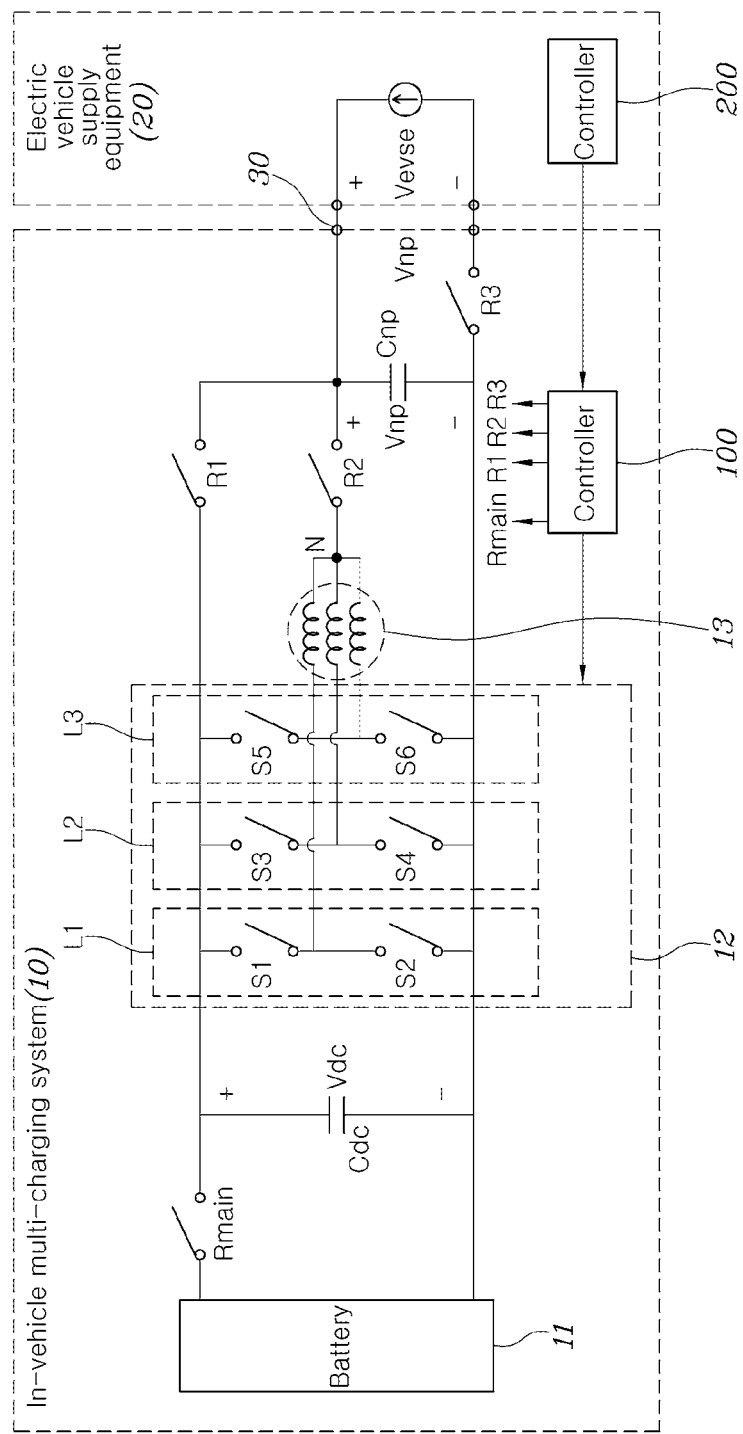
FIG. 1 is a circuit diagram of a multi-input charging system using a motor driving system according to an exemplary embodiment of the present disclosure.

Referring to FIG. 1, a charging system 10 according to an exemplary embodiment of the present disclosure is a system that charges a battery 11 by appropriately controlling a connection state of relays R1 and R2 according to the magnitude of a voltage of charging power provided from external electric vehicle supply equipment (EVSE) 20 to directly supply the power of the external electric vehicle supply equipment 20 to the battery 11, or by converting the magnitude of the voltage by utilizing an inverter 12 provided to drive a motor 13 and supplying the voltage to the battery 11.

In general, the system for driving the motor 13 may include a battery 11 which is an energy storage device that stores electric power for driving the motor 13, and an inverter 12 that converts direct current (DC) power stored in the battery 11 to alternate current (AC) power of three phases and provides the AC power to the motor 13. The inverter 12 has three legs connected to a positive (+) terminal and a negative (−) terminal of the battery 11 in parallel to each other, and two switching elements (two of S1 to S6) are connected in series to each of the legs L1 to L3 and driving power of one phase is provided from a connection node of two switching elements to the motor 13. In this way, in a motor driving mode for driving the motor 13, energy flows from the battery 11 of FIG. 1 to the motor 13.

Meanwhile, unlike the above-described flow of the energy for driving the motor, in a charging mode for charging the battery 11, energy flows from the external electric vehicle supply equipment 20 to the battery 11. The external electric vehicle supply equipment 20 and the battery 11 may be directly connected to each other such that the charging power is provided to the battery 11 according to the magnitude of the voltage of the charging power provided by the external electric vehicle supply equipment 20, or the battery 11 may be charged by providing external charging power to a neutral point N of the motor 13 is provided to the leg corresponding to each of the phases of the inverter 12, controlling a switching element of each of the legs to boost the voltage of the external charging power, and providing the boosted external charging power to the battery 11.

Here, in the charging mode in which energy flows from the electric vehicle supply equipment 20 to the battery 11, one three phase coil of the motor 13 and the switching elements S1 to S6 in the legs L1 to L3 of the inverter 12 connected thereto may constitute one booster circuit. In other words, a circuit in which a total of three booster circuits are connected in parallel between a neutral point N of the motor 13 and the battery 11 is constituted by a three phase motor and a three phase inverter.

In the motor driving system according to an exemplary embodiment of the present disclosure, a controller 100 may control a connection state of the relays R1 and R2 according to the magnitude of the voltage of the charging power provided from the electric vehicle supply equipment 20.

The controller 100 of the motor driving system according to an exemplary embodiment of the present disclosure may be a processor (e.g., computer, microprocessor, CPU, ASIC, circuitry, logic circuits etc.). The controller 100 may be implemented by a non-transitory memory storing, e.g., a program(s), software instructions reproducing algorithms, etc., which, when executed, controls operations of various components of the motor driving system, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

Figure 2:
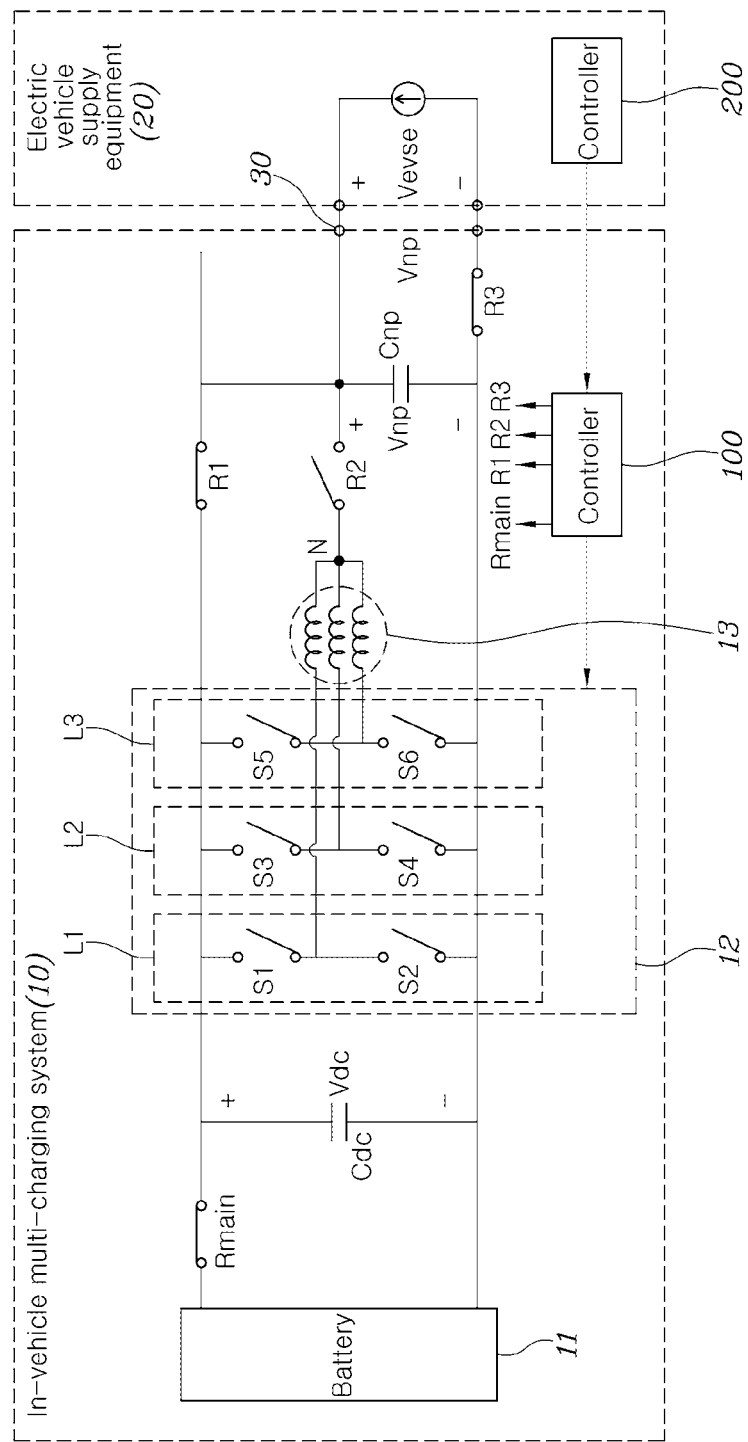
FIG. 2 is a circuit diagram illustrating a state of a relay when the multi-input charging system using a motor driving system according to an exemplary embodiment of the present disclosure charges a battery to a first charging voltage.
Figure 3:
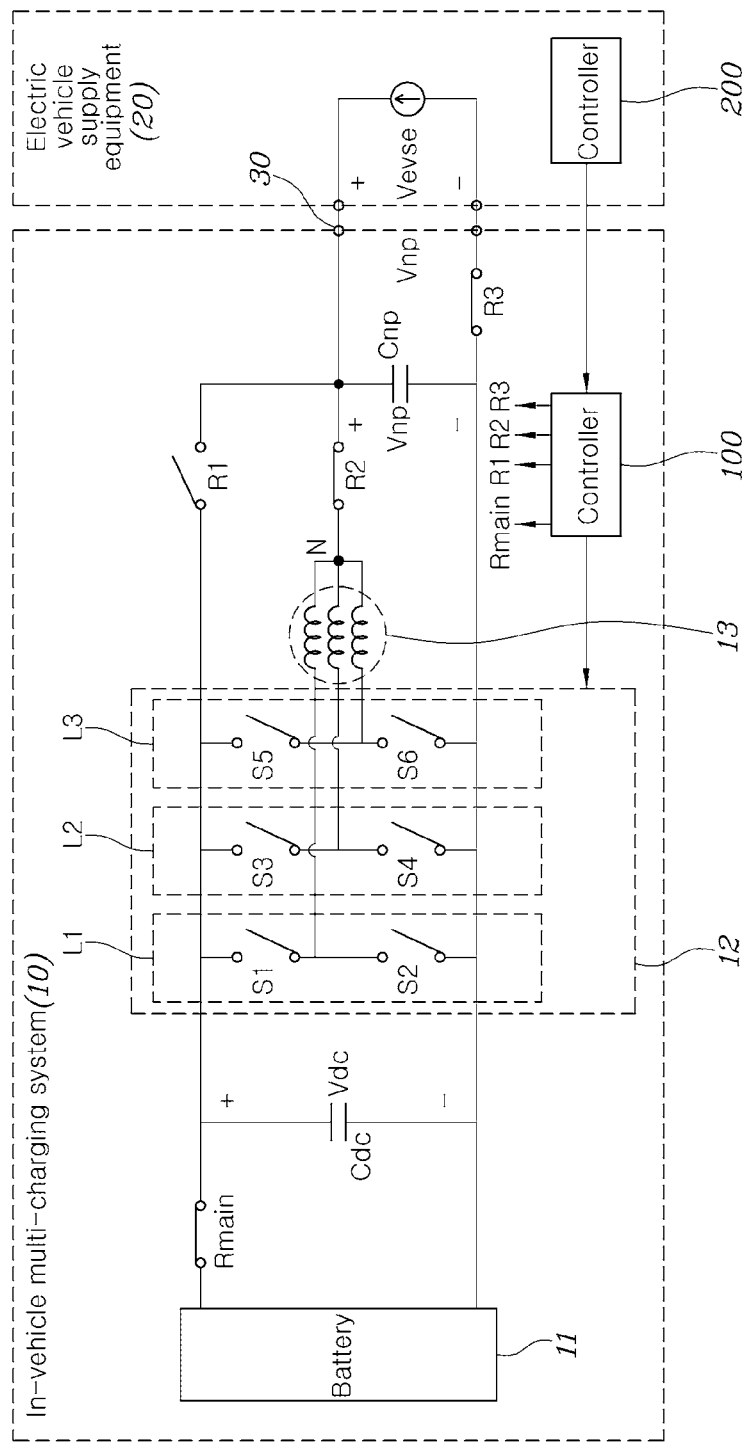
FIG. 3 is a circuit diagram illustrating a state of a relay when the multi-input charging system using a motor driving system according to an exemplary embodiment of the present disclosure charges a battery to a second charging voltage.

FIG. 2 is a circuit diagram illustrating a state of a relay when the multi-input charging system using a motor driving system according to an exemplary embodiment of the present disclosure charges a battery to a first charging voltage. FIG. 3 is a circuit diagram illustrating a state of a relay when the multi-input charging system using a motor driving system according to an exemplary embodiment of the present disclosure charges a battery to a second charging voltage.

As illustrated in FIG. 2, when the voltage of the DC power provided from the electric vehicle supply equipment 20 has a magnitude, by which the battery may be charged, the controller 100 may directly apply the DC power provided by the electric vehicle supply equipment 20 to the battery 11 after switching on a third relay R3 that determines an electrical connection state of a charging power input terminal 30 and the neutral point N of the motor 13 to convert the connection state into a short-circuit state and controlling the first relay R1 to a short-circuit state.

Further, as illustrated in FIG. 3, when the voltage of the DC power provided by the electric vehicle supply equipment 20 has a magnitude that is smaller than that of the voltage of the battery 11, the controller 100 may control the second relay R2 to a short-circuit state by switching of the third relay R3 that determines an electrical connection state of the charging power input terminal 30 and the neutral point N of the motor 13, the controller 100 may boost the voltage of the DC power of the electric vehicle supply equipment 20 to a desired voltage through a duty control of the switching elements S1 to S6 by using a booster circuit implemented by inductances of the coils of the motor 13 and the switching elements S1 to S6 of the inverter 12, and the boosted voltage of the DC power may be applied to the battery 11.

As described above, the first relay R1 is a relay that determines an electrical connection state of the battery 11 and the charging power input terminal 30 that receives charging power from the electric vehicle supply equipment 20, and the second relay R2 is a relay that determines an electrical connection state of the neutral point N of the motor 13 and the charging power input terminal 30.

When the above process of charging the battery 11 through the control of the states of the relays R1 to R3 and the control of the inverter 12 is completed, the controller 100 may provide a control technique for compulsorily discharging the voltage charged in the neutral point capacitor Cnp. Various control techniques that is performed by the controller 100 to compulsorily discharge a capacitor will be understood more clearly through a description of the multi-input charging method using a motor driving system according to an exemplary embodiment of the present disclosure, which will be described below.

The multi-input charging system using a motor driving system according to an exemplary embodiment of the present disclosure may further include a main relay Rmain and a third relay R3. The main relay Rm is a relay connected between the battery 11 and the inverter 12 to determine an electrical connection relationship between the battery 11 and the inverter 12, and as described above, the third relay R3 is a relay that determines an electrical connection relationship between the charging power input terminal 30 and the neutral point capacitor CnP.

In addition, the multi-input charging system using a motor driving system according to an exemplary embodiment of the present disclosure, as described above, may further include a neutral point capacitor Cnp connected between a positive (+) terminal and a negative (−) terminal of the charging power input terminal 30 that receives charging power from the electric vehicle supply equipment 20 to form a DC voltage Vnp, and a DC capacitor Cdc provided at a input terminal of the battery 11 of the inverter 12.

Figure 4:
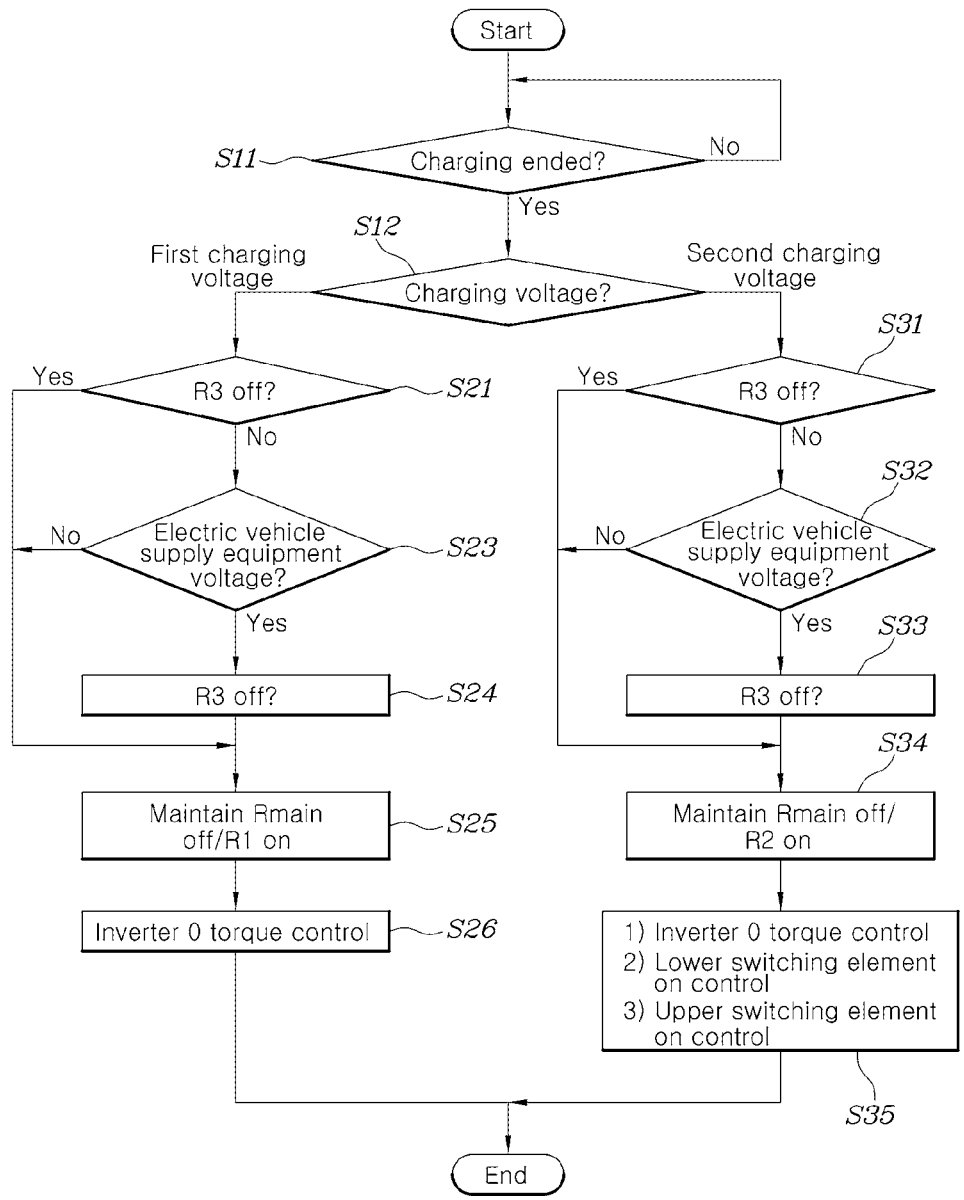
FIG. 4 is a flow chart illustrating a multi-input charging method using a motor driving system according to an exemplary embodiment of the present disclosure.

FIG. 4 is a flow chart illustrating a multi-input charging method using a motor driving system according to an exemplary embodiment of the present disclosure.

FIG. 4 illustrates a multi-input charging method using a motor driving system according to an exemplary embodiment of the present disclosure after charging is completed, when it is identified that charging is completed (S11), the controller 100 may apply, according to the magnitude of the charging voltage input from the external electric vehicle supply equipment 20 to the charging power input terminal 30 during the charging (S12), an appropriate compulsory discharging technique corresponding thereto.

Here, the completion of charging may be determined by the controller 100 when the state of charge (SOC) of the battery 11, that is to be charged, reaches a preset charging value.

When the charging voltage input from the external electric vehicle supply equipment 20 is a first charging voltage that is a voltage of a magnitude, by which the battery 100 may be charged, as illustrated in FIG. 2, the first relay R1 is changed to an on-state during charging and external charging power is directly provided to the battery 11 through the first relay R1 and the main relay Rmain. If the process of charging the battery 11 by the first charging voltage is completed, after identifying the third relay R3 that forms an electrical connection of the external electric vehicle supply equipment 20 and the vehicle system 10 is in an off state (S21), the controller 100 identifies whether a charging voltage is applied from the external electric vehicle supply equipment 20 if the electrical connection is not in an off state (S23).

Thereafter, the controller 100 may omit a control of switching off the third relay R3 when a charging voltage is not supplied from the electric vehicle supply equipment (S23), and may perform a control of switching off the third relay R3 when a charging voltage is supplied from the electric vehicle supply equipment (S22).

In the process of charging the battery, the controller 100 provided in the vehicle system 10 and the controller 200 provided in the electric vehicle supply equipment 20 may communicate with each other through a separate communication line. When the controller 100 of the vehicle system 10 determines that the charging of the battery 11 is completed, the determination result may be provided to the controller 200 in the electric vehicle supply equipment 20 such that the controller 200 may stop the supply of the charging power. In this case, a charging voltage may not be applied from the external electric vehicle supply equipment 20 to the charging power input terminal 30, a compulsory discharging control of the capacitor may be immediately controlled without having to switch off the third relay R3.

If the electric vehicle supply equipment 20 determines that it is impossible to control direct supply of charging power by the controller 200 or charging power is continuously supplied by an error in communication with the controller 100 or the like, it is inevitably necessary to switch off the third relay R3.

Thereafter, in a state in which an external charging voltage is not applied to the charging power input terminal by stopping supply of the charging power by the external electric vehicle supply equipment 20 or switching-off of the third relay R3, the controller 100 performs zero torque control for the switching elements in the inverter 12 (S26) while continuously maintaining an on-state of the first relay R1 (S25).

The zero torque control of the inverter 12 is performed such that the d-axis component of the current output from the inverter 12 to the motor 13 has a preset value other than 0 and the q-axis component thereof is 0, and among current commands for controlling the inverter 12, a q-axis current command is set to 0 and a d-axis current command is set to a preset value other than 0. Through the zero torque control, a torque of the motor 13 is not generated, and the power provided to the motor 13 may be consumed by heat emission of the motor 13.

That is, because the first relay R1 maintains an on-state in operation S25, the neutral point capacitor Cnp forms a parallel connection relationship with the battery input terminal DC capacitor Cdc of the inverter 12, and the neutral point capacitor Cnp and the DC capacitor Cdc form a predetermined voltage at the battery input terminal of the inverter 12. In operation S26, the controller 100 sets, among the current commands of the inverter 12, the q-axis current command to 0 while maintaining the d-axis current command at a constant value other than 0 such that the charging voltages of the neutral capacitor Cnp and the DC capacitor Cdc are consumed while a torque is not generated in the motor 13, thereby compulsorily discharging the neutral point capacitor Cnp and the DC capacitor Cdc.

The switching schemes of the switching elements S1 to S6 for a zero torque control of the inverter 12 may be changed according to a modulation scheme applied to control the inverter 12 or the like, and because various techniques for controlling the inverter 12 to a zero torque are known in the technical field, a detailed description of on/off state control of the switching elements S1 to S6 will be omitted.

Of course, in operation S25, the controller 100 has to stop the charging of the capacitors by the battery 11 by cutting off the connection of the battery 11, which has been completely charged, and the inverter 12.

Meanwhile, when the charging voltage input from the external electric vehicle supply equipment 20 is a second charging voltage having a magnitude that is smaller than that of the voltage of the battery 100, and as illustrated in FIG. 3, the second relay R2 is changed to an on-state during charging and external charging power is directly provided to the battery 11 through the boosting control of the second relay R1 and the inverter 12. When the process of charging the battery 11 by the second charging voltage is completed, the controller 100 may perform substantially the same process as the above-described operations S21 to S23. That is, the controller 100 may perform a process of making a state in which an external charging voltage is not applied to the charging power input terminal 30 by identifying the magnitude of the charging voltage applied from the external electric vehicle supply equipment 20 and selectively switching the third relay R3 to an off state (S31 to S33).

Thereafter, the controller 100 may control the switching elements in the inverter 12 in various schemes (S35) by switching off the main relay Rmain and continuously maintaining the second relay R2 in an on-state (S34).

When the second relay R2 is in an on-state, the capacitors may be compulsorily discharged by controlling the inverter 12 in various schemes. First, as described in the above-described operation S26, the method for controlling the inverter applied to the compulsory discharging scheme may include a zero torque control scheme of setting the q-axis current command of the inverter 12 to 0 and setting the d-axis current command to a constant value other than 0, a scheme of switching on at least one of, among the switching elements included in the leg corresponding to each of the phases of the inverter 12, the upper switching elements S1, S3, and S5 connected to the motor 13 and the positive terminal of the battery 11, and a scheme of switching on at least one of, among the switching elements included in the leg corresponding to each of the phases of the inverter 12, the lower switching elements S2, S4, and S6 connected to the motor 13 and the negative terminal of the battery 11, and In operation S35, the controller 100 may compulsorily charge the capacitors by selectively applying an appropriate control method, among a zero torque control, a scheme of switching on at least one of the upper switching elements S1, S3, and S5, and a scheme of switching on at least one of the lower switching elements S2, S4, and S6.

First, in operation S35, the controller 100 may compulsorily discharge the capacitors by performing zero torque control as in operation S26. In this case, the DC capacitor Cdc connected to an input terminal of the battery 11 of the inverter 12 is discharged by the heat emission of the motor 13, and in this process, the neutral point capacitor Cnp also may be discharged by a current path formed during the on/off control of the switching elements.

Next, in operation S35, the controller 100 may compulsorily discharge the neutral point capacitor Cnp by performing a scheme of, as in operation S26, performing zero torque control to discharge the DC capacitor Cdc connected to the input terminal of the battery 11 of the inverter 12 and switching on at least one of the lower switching elements S2, S4, and S6 connected to the motor 13 and the negative terminal of the battery 11. The zero torque control is a control for mainly discharging the DC capacitor Cdc, and may be a state in which the neutral point capacitor Cnp is not completely discharged even after the discharging of the DC capacitor Cdc is completed. Accordingly, in operation S35, the neutral point capacitor Cnp may be discharged by, after performing zero torque control of the inverter 12 for a predetermined time period, switching on at least one of the lower switches S2, S4, and S6 of the inverter 12 and forming a current path sequentially including the neutral point capacitor Cnp, the second relay R2, the lower switching elements S2, S4, and S6, and the neutral point capacitor Cnp.

In the scheme, all of the lower switching elements of each of the legs may be switched on or only some of the lower switching elements of the leg may be switched on first. When the lower switching element, which is switched on, is damaged by a fire or may be damaged by a fire, for example, when the heat emission of the lower switching element, which is switched on, is a preset level or more, a scheme of switching on the lower switching element of another leg and switching off the lower switching elements, which emits heat, may be applied. Of course, when the switching element, which is switched off, due to the possibility of damage by a fire in an on-state recovers a normal state (a decrease in emission of heat), the switching element may be switched on again.

Next, in operation S35, the controller 100 may discharge the DC capacitor Cdc and the neutral point capacitor Cnp at the same time by applying a scheme of switching on at least one of the upper switching elements S1, S3, and S5 of the inverter 12. When the scheme is applied, the DC capacitor Cdc and the neutral point capacitor Cnp may be discharged at the same time by forming a current path sequentially including the DC capacitor Cdc, the neutral point capacitor Cnp, the second relay R2, the upper switching elements S1, S3, and S5, and the DC capacitor Cdc.

In this scheme, a scheme of switching on all of the upper switching elements S1, S3, and S5 or switching on some of the upper switching elements first may be applied. When the upper switching element, which is switched on, is damaged by a fire or may be damaged by a fire, for example, when the heat emission of the upper switching element, which is switched on, is a preset level or more, a scheme of switching on the upper switching element of another leg and switching off the upper switching elements, which emits heat, may be applied. Of course, when the switching element, which is switched off, due to the possibility of damage by a fire in an on-state, recovers a normal state (a decrease in emission of heat), the switching element may be switched on again.

As described above, according to the multi-input charging system and the multi-input charging method using a motor driving system according to various exemplary embodiments of the present disclosure, a danger of electrically shocking the driver or the operator may be eliminated by charging the battery by utilizing a system provided in advance and promptly compulsorily discharging the charging voltage of high voltage formed in the DC capacitor between the neutral point capacitor, which forms a neutral point voltage in the charging process, and the inverter and the battery, even when the charging voltage provided from the electric vehicle supply equipment is different from the voltage of the battery that is to be charged, and various safety references required by the rules can be satisfied.

Although the specific exemplary embodiments of the present disclosure have been illustrated and described until now, it is apparent to an ordinary person in the art to which the present disclosure pertains that the present disclosure may be variously improved and modified without departing from the scope of the claims.

What is claimed is:

1. A multi-input charging system using a motor driving system, the multi-input charging system comprising:
   an inverter connected to a battery which is chargeable and including a plurality of switching elements;
   a motor connected to the inverter and configured to supply power, which is provided to a neutral point of the motor, to the inverter;
   a first relay having one end connected to the battery and an opposite end connected to a charging power input terminal to which DC charging power is input from outside;
   a second relay having one end connected to the neutral point and an opposite end connected to the charging power input terminal;
   a neutral point capacitor connected to the opposite end of the first relay and the opposite end of the second relay and configured to form an input charging voltage;
   a third relay having one end connected to the neutral point capacitor and an opposite end connected to the charging power input terminal; and
   a controller configured to: in a charging mode for charging the battery,
   switch on the third relay and selectively switch on the first relay and the second relay based on a magnitude of the DC charging voltage to supply the DC charging power to the battery, and
   control the plurality of switching elements of the inverter to compulsorily discharge the neutral point capacitor when charging of the battery is completed.

2. The multi-input charging system of claim 1, wherein the controller is further configured to
   switch on the first relay and switch off the second relay to directly provide the DC charging power to the battery when the magnitude of the DC charging voltage is a magnitude allowing the battery to be charged in the charging mode.

3. The multi-input charging system of claim 2, wherein the controller is further configured to:
   maintain an on-state of the first relay after cutting off the DC charging power when the charging of the battery is completed, and
   perform a zero torque control of controlling the plurality of switching elements such that a d-axis component of a current provided from the inverter to the motor is a preset value other than 0 and a q-axis component of the current is 0.

4. The multi-input charging system of claim 3, further comprising:
   a main relay having one end connected to the battery and an opposite end connected to the one end of the first relay; and
   a DC capacitor connected to the opposite end of the main relay to form a DC voltage of an output terminal of the battery,
   wherein the controller is further configured to
   switch off the main relay after cutting off the DC charging power when the charging of the battery is completed.

5. The multi-input charging system of claim 1, wherein the controller is further configured to:
   switch on the second relay and switch off the first relay to supply DC charging power to the neutral point of the motor when the magnitude of the DC charging voltage is smaller than a magnitude of a voltage of the battery in the charging mode, and
   boost a voltage of the neutral point by controlling the switching elements of the inverter and apply the boosted voltage of the neutral point to provide charging power to the battery.

6. The multi-input charging system of claim 5, wherein the controller is further configured to:
   maintain an on-state of the second relay after cutting off the DC charging power when the charging of the battery is completed, and
   perform at least one of:
   a zero torque control of controlling the plurality of switching elements such that a d-axis component of the current provided from the inverter to the motor is a preset value other than 0 and a q-axis component thereof is 0,
   a technique of switching on at least one of, among the plurality of switching elements of the inverter, a plurality of lower switching elements connected between the motor and a negative terminal of the battery, or
   a technique of switching on at least one of, among the plurality of switching elements of the inverter, a plurality of upper switching elements connected between opposite terminals of the battery.

7. The multi-input charging system of claim 6, wherein the controller is configured to perform any one of:
   the zero torque control,
   after performing the zero torque control, the technique of switching on the at least one of the plurality of lower switching elements, or
   the technique of switching on the at least one of the plurality of upper switching elements.

8. The multi-input charging system of claim 6, further comprising:

a main relay having one end connected to the battery and an opposite end connected to the one end of the first relay; and a DC capacitor connected to the opposite end of the main relay to form a DC voltage of an output terminal of the battery, wherein the controller is further configured to switch off the main relay after cutting off the DC charging power when the charging of the battery is completed.

9. A charging method using the multi-input charging system of claim 1, the charging method comprising:

determining whether the charging of the battery is completed;

cutting off supply of the DC charging power when it is determined that the charging of the battery is completed; and determining an inverter control scheme for discharging the neutral point capacitor based on the DC charging power, and discharging the neutral point capacitor by controlling the plurality of switching elements in the inverter through the determined inverter control scheme.

10. The charging method of claim 9, wherein the cutting off includes:

identifying a voltage of the charging power input terminal; and switching off the third relay when the voltage of the charging power input terminal is not zero.

11. The charging method of claim 9, wherein the cutting off includes:

identifying a voltage of the charging power input terminal; and maintaining a state of the third relay when the voltage of the charging power input terminal is not zero.

12. The charging method of claim 9, wherein the discharging the neutral point capacitor includes:

when the battery is charged by switching on the first relay and switching off the second relay to directly provide the DC charging power to the battery, cutting off the DC charging power;

maintaining an on-state of the first relay; and performing a zero torque control of controlling the plurality of switching elements such that a d-axis component of a current provided from the inverter to the motor is a preset value other than 0 and a q-axis component thereof is 0.

13. The charging method of claim 12, wherein the multi-input charging system further comprises:

a main relay having one end connected to the battery and an opposite end connected to the one end of the first relay; and a DC capacitor connected to the opposite end of the main relay to form a DC voltage of an output terminal of the battery, and the maintaining the on-state of the first relay includes:

after cutting off the DC charging power, maintaining the on-state of the first relay and switching off the main relay.

14. The charging method of claim 9, wherein the discharging the neutral point capacitor includes:

switching on the second relay and switching off the first relay to supply DC charging power to the neutral point of the motor;

after cutting off the DC charging power, maintaining an on-state of the second relay when the battery is charged by boosting a voltage of the neutral point by controlling the plurality of switching elements of the inverter and applying the boosted voltage to the battery to charge the battery; and performing at least one of:

a zero torque control of controlling the plurality of switching elements such that a d-axis component of the current provided from the inverter to the motor is a preset value other than 0 and a q-axis component thereof is 0, a technique of switching on at least one of, among the plurality of switching elements of the inverter, a plurality of lower switching elements connected between the motor and a negative terminal of the battery, or a technique of switching on at least one of, among the plurality of switching elements of the inverter, a plurality of upper switching elements connected between opposite terminals of the battery.

15. The charging method of claim 14, wherein the performing includes performing any one of:

the zero torque control, after performing the zero torque control, the technique of switching on the at least one of the plurality of lower switching elements, or the technique of switching on the at least one of the plurality of upper switching elements.

16. The charging method of claim 14, wherein the performing a technique of switching on at least one of, among the plurality of switching elements of the inverter, a plurality of lower switching elements connected between the motor and a negative terminal of the battery includes switching off the one lower switching element that emits heat and switching on another lower switching element when one lower switching element of the plurality of lower switching elements is switched off and then the one lower switching element in an on-state emits heat.

17. The charging method of claim 14, wherein the performing a technique of switching on at least one of, among the plurality of switching elements of the inverter, a plurality of upper switching elements connected between opposite terminals of the battery includes switching off the one upper switching element that emits heat and switching on another upper switching element when one upper switching element of the plurality of upper switching elements is switched off and then the one upper switching element in an on-state emits heat.

18. The charging method of claim 14, wherein the multi-input charging system further comprises:

a main relay having one end connected to the battery and an opposite end connected to the one end of the first relay; and a DC capacitor connected to the opposite end of the main relay to form a DC voltage of an output terminal of the battery, and the maintaining an on-state of the second relay includes after cutting off the DC charging power, maintaining the on-state of the second relay and switching off the main relay.

* * * * *